(12) United States Patent
Iguchi et al.

(10) Patent No.: US 8,830,488 B2
(45) Date of Patent: Sep. 9, 2014

(54) DECOLORING APPARATUS AND CONTROL METHOD FOR DECOLORING APPARATUS

(75) Inventors: Ken Iguchi, Shizuoka-ken (JP); Isao Yahata, Shizuoka-ken (JP); Takahiro Kawaguchi, Shizuoka-ken (JP); Hiroyuki Taguchi, Shizuoka-ken (JP); Hiroyuki Tsuchihashi, Shizuoka-ken (JP); Hiroyuki Taki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 258 days.

(21) Appl. No.: 13/315,156

(22) Filed: Dec. 8, 2011

(65) Prior Publication Data

US 2012/0149562 A1 Jun. 14, 2012

Related U.S. Application Data

(60) Provisional application No. 61/421,604, filed on Dec. 9, 2010, provisional application No. 61/435,572, filed on Jan. 24, 2011.

(51) Int. Cl.
| | |
|---|---|
| *G06K 15/00* | (2006.01) |
| *H04N 1/00* | (2006.01) |
| *H04N 1/203* | (2006.01) |
| *H04N 1/193* | (2006.01) |
| *H04N 1/12* | (2006.01) |

(52) U.S. Cl.
CPC .... *H04N 1/00633* (2013.01); *H04N 2201/0081* (2013.01); *H04N 1/0032* (2013.01); *H04N 1/2032* (2013.01); *H04N 1/193* (2013.01); *H04N 1/12* (2013.01)

USPC .......... 358/1.12; 358/1.9; 358/505; 382/112; 271/15; 271/19; 271/4.02; 271/4.03; 399/16; 399/45; 347/179

(58) Field of Classification Search
USPC .................. 358/1.9, 2.1, 1.12, 505; 382/112; 271/3.15, 3.17, 3.19, 4.01, 4.02, 4.03; 399/16, 45; 347/179
See application file for complete search history.

(56) References Cited

U.S. PATENT DOCUMENTS

| | | | | |
|---|---|---|---|---|
| 5,572,311 | A | * | 11/1996 | Abe et al. ....................... 399/127 |
| 6,373,575 | B1 | * | 4/2002 | Takayama et al. ............. 356/445 |
| 2005/0141906 | A1 | * | 6/2005 | Murakami ....................... 399/45 |

FOREIGN PATENT DOCUMENTS

| | | |
|---|---|---|
| JP | 05-201101 | 8/1993 |
| JP | 06-024080 | 2/1994 |
| JP | 2006-016155 | 1/2006 |

* cited by examiner

*Primary Examiner* — Jamares Q Washington
(74) *Attorney, Agent, or Firm* — Patterson & Sheridan LLP

(57) ABSTRACT

According to one embodiment, first and second branch paths of a decoloring apparatus are formed downstream in a sheet conveying direction of a reading section in a conveying path. A diverting section is provided at a branch point of the first and second branch paths in the conveying path. A control section determines on the basis of image data whether decoloring processing should be applied to a sheet, diverts, if determining that the decoloring processing should be applied to the sheet, the sheet to the first branch path with the diverting section, and diverts, if determining that the decoloring processing should not be applied to the sheet, the sheet to the second branch path with the diverting section. A decoloring section is provided between the reading section and the branch point in the conveying path and heats the sheet to decolor an image formed with a decolorable color material.

17 Claims, 14 Drawing Sheets

DECOLORING APPARATUS AND CONTROL METHOD FOR DECOLORING APPARATUS

CROSS-REFERENCE TO RELATED APPLICATION

This application is based upon and claims the benefit of priority from U.S. provisional application 61/421,604, filed on Dec. 9, 2010; and U.S. provisional application 61/435,572, filed on Jan. 24, 2011; the entire contents of which are incorporated herein by reference.

FIELD

Embodiments described herein relate generally to a decoloring apparatus that erases a color of an image formed on a sheet using a decolorable color material and a control method for the decoloring apparatus.

BACKGROUND

There is a decoloring apparatus that erases a color of an image from a sheet subjected to image formation. The decoloring apparatus heats a sheet on which an image is formed with a decolorable color material and erases a color of the color material that forms the image on the sheet. The decoloring apparatus determines, before decoloring the image, whether the sheet is reusable. If prohibition information indicating that the image should not be decolored is included in the image or if a tear or the like occurs in the sheet, the decoloring apparatus determines that the sheet is unreusable and discharges the sheet without performing decoloring processing. Such a decoloring apparatus includes components such as a sheet conveying path, a reading section, a decoloring section, and a reusable sheet tray. In the conveying path, a conveying path in which an unreusable sheet tray is provided branches from a section between the reading section and the decoloring section.

In other words, the sheet conveying path of the decoloring apparatus branches to a first branch path and a second branch path on a downstream side in a sheet conveying direction of the reading section. The first branch path conveys the sheet to the decoloring section and the reusable sheet tray. The second branch path conveys the sheet to the unreusable sheet tray.

The decoloring apparatus reads, with the reading section, an image on a sheet and diverts, for example, if the prohibition information is not included in the image on the sheet, the sheet to the first branch path. After heating the sheet to decolor the image with the decoloring section, the decoloring apparatus discharges the sheet to the reusable sheet tray. If the prohibition information is included in the image on the sheet, the decoloring apparatus diverts the sheet to the second branch path and discharges the sheet to the unreusable sheet tray.

Such a decoloring apparatus reads an image for one sheet with the reading section and then determines whether the sheet is reusable. Therefore, length for one sheet is necessary between the reading section and a branch point in the sheet conveying path. In the first branch path through which a sheet, an image on which should be decolored, is conveyed, a space for setting the decoloring section is necessary. Therefore, such a decoloring apparatus in the past tends to be increased in size.

DETAILED DESCRIPTION

In general, according to one embodiment, a decoloring apparatus includes a reading section, first and second branch paths, a diverting section, a control section, and a decoloring section. The reading section reads an image on a sheet on which the image is formed with a decolorable color material. The first and second branch paths are formed downstream in a sheet conveying direction of the reading section in a conveying path. The diverting section is provided at a branch point of the first and second branch paths in the conveying path. The control section determines on the basis of image data read by the reading section whether decoloring processing should be applied to the sheet, diverts, if determining that the decoloring processing should be applied to the sheet, the sheet to the first branch path with the diverting section, and diverts, if determining that the decoloring processing should not be applied to the sheet, the sheet to the second branch path with the diverting section. The decoloring section is provided between the reading section and the branch point in the conveying path and heats the sheet to decolor the image formed with the decolorable color material.

In general, according to another embodiment, a control method for a decoloring apparatus is a control method for a decoloring apparatus including: a reading section provided in a conveying path and configured to read an image on a sheet on which the image is formed with a decolorable color material; a conveying roller configured to convey the sheet in the conveying path; first and second branch paths formed downstream in a sheet conveying direction of the reading section in the conveying path; and a diverting section provided at a branch point of the first and second branch paths in the conveying path. The control method for the decoloring apparatus includes determining, on the basis of image data read by the reading section, whether decoloring processing should be applied to the sheet; causing, if it is determined that the decoloring processing should not be applied to the sheet, the sheet to pass at first speed in a decoloring section provided between the reading section and the branch point in the conveying path and diverting the sheet to the second branch path with the diverting section; and applying, if it is determined that the decoloring processing should be applied to the sheet, while causing the sheet to pass at second speed lower than the first speed in the decoloring section, the decoloring processing to the sheet with the decoloring section and diverting the sheet subjected to the decoloring processing to the first branch path with the diverting section.

Embodiments are explained below with reference to the accompanying drawings.

First Embodiment

Figure 1:
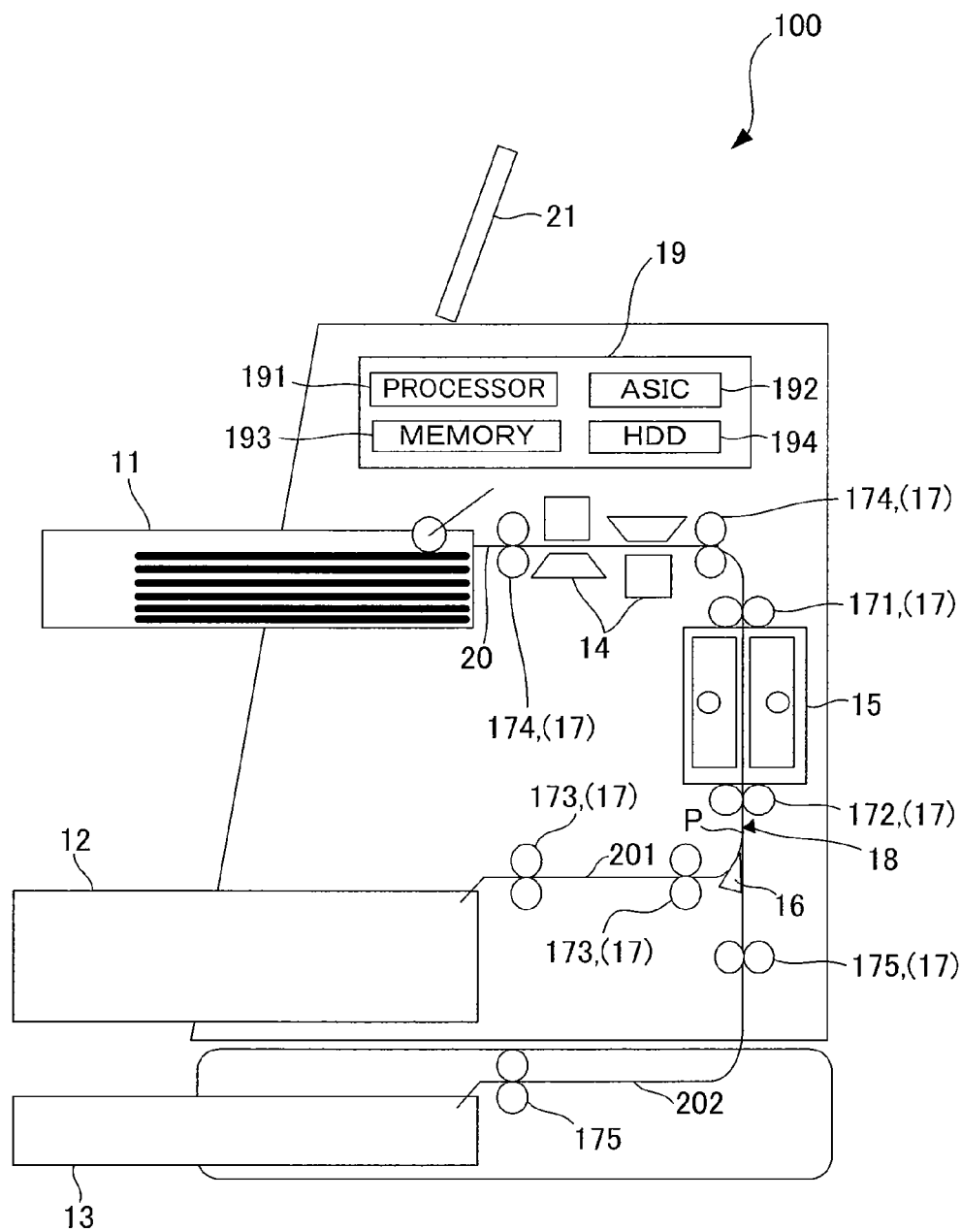
FIG. 1 is a diagram of a decoloring apparatus.
Figure 2:
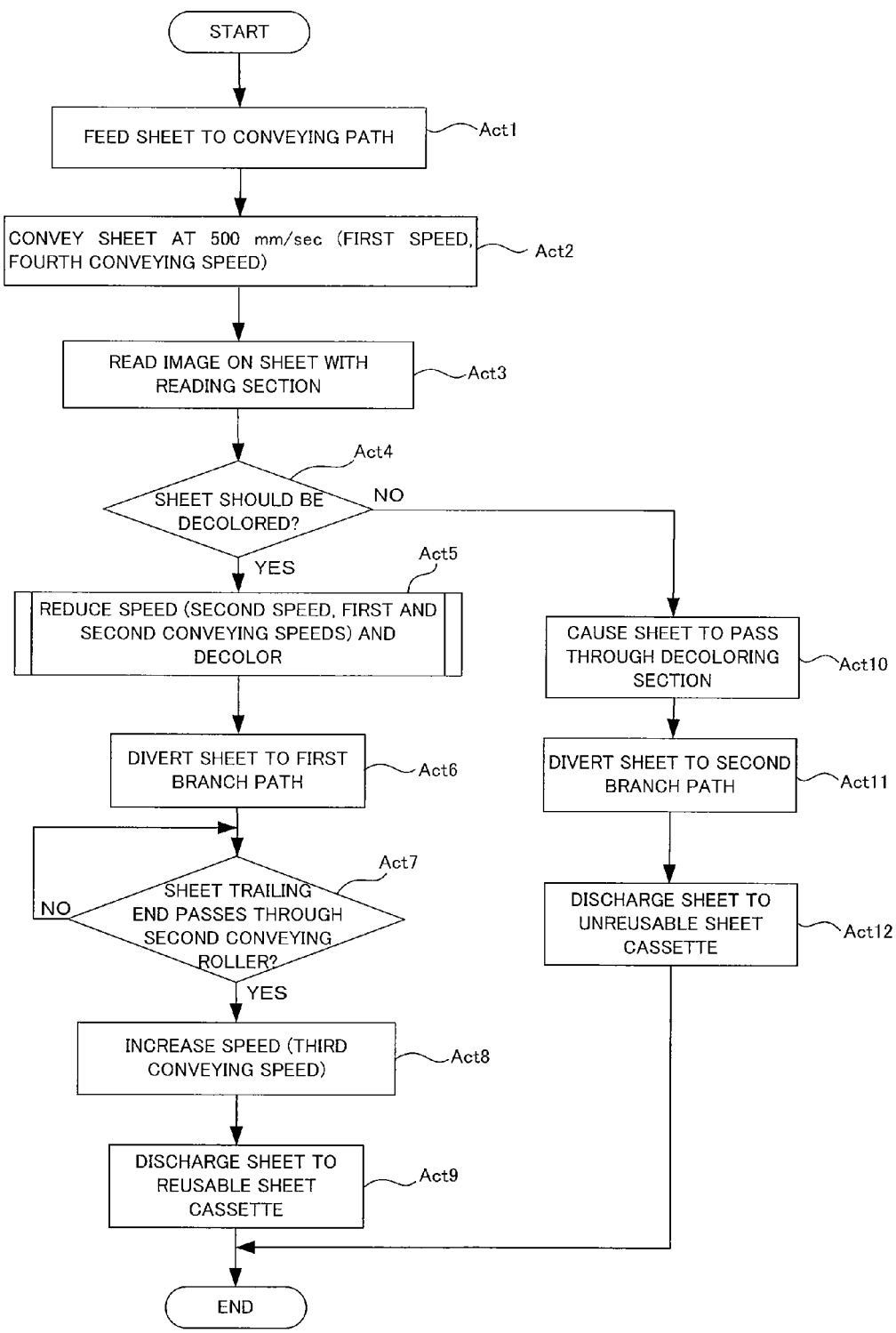
FIG. 2 is a flowchart for explaining a sheet decoloring processing method by the decoloring apparatus.

FIG. 1 is a diagram of a decoloring apparatus 100.

The decoloring apparatus 100 applies decoloring processing for heating a sheet and decoloring an image to a sheet on which an image is formed with a decolorable color material, which is decolored if heated. The decolorable color material may be a decolorable toner in a powder state or may be decolorable ink in a liquid state.

The decoloring apparatus 100 includes sheet trays 11 to 13, a reading section 14, a decoloring section 15, a diverting section 16, conveying rollers 17, a sensor 18, a control section 19, a conveying path 20, and a display section 21.

The components 11 to 18 are provided in the conveying path 20. The conveying path 20 branches to a first branch path 201 and a second branch path 202 at a branch point P. A sheet subjected to the decoloring processing is conveyed to the first branch path 201. A sheet not subjected to the decoloring processing is conveyed to the second branch path 202.

A distance in a sheet conveying direction from the reading section 14 to the branch point P is a distance slightly larger than the length of the long side of an A4 size (210 mm×297 mm) sheet. The distance may be a distance slightly larger than the length of the long side of a letter size (216 mm×279 mm) sheet.

The sheet tray 11 stores sheets on which images are formed with the decolorable color material. The reusable sheet tray 12 is provided in the first branch path 201 and stores sheets subjected to the decoloring processing. The unreusable sheet tray 13 is provided in the second branch path 202 and stores sheets not subjected to the decoloring processing.

The reading section 14 includes a reading unit such as a line sensor including a CCD (Charge Coupled Device) image sensor or a CMOS sensor. In this embodiment, the reading section 14 includes two units provided along the conveying path 20 and reads images on a first side and a second side of a sheet. In other words, the reading section 14 enables both-side reading of images on a conveyed sheet. Image data read by the reading section 14 is stored in a memory 193 of the control section 19. For example, images on a sheet read by the reading section 14 before the sheet is subjected to the decoloring processing are converted into an electronic form and stored in the memory 193. This makes it possible to acquire image data when data of a decolored image is necessary later. The control section 19 explained later determines, on the basis of images read by the reading section 14, whether the sheet is a decolorable sheet or an reusable sheet.

Two decoloring section 15 includes two decoloring units for decoloring of the first side and the second side of the sheet. For example, the decoloring section 15 heats a sheet in a noncontact manner and erases a color of an image. The decoloring section 15 may include any one of a thermal head, a halogen heater, a graphite heater, and an IH (Induction Heater). Alternatively, the decoloring section 15 may erase a color of an image formed on a sheet with the decolorable color material by, in a state in which the decoloring section 15 is in contact with a conveyed sheet, heating the sheet to predetermined decoloring temperature. In this embodiment, it is assumed that the decoloring section 15 can perform the decoloring processing for a sheet passing at maximum speed 250 mm/s. The decoloring section 15 is located in a position where the leading end of the A4 size sheet or the letter size sheet reaches the decoloring section 15 before reading of the sheet ends in the reading section 14.

The diverting section 16 is a flapper and diverts a sheet conveyed to the diverting section 16 to the first branch path 201 or the second branch path 202.

Plural conveying rollers 17 are provided. The conveying rollers 17 respectively nip and convey sheets in the conveying path 20 and the branch paths 201 and 202 to the downstream side in the sheet conveying direction. The conveying rollers 17 include a first conveying roller 171 provided upstream in the sheet conveying direction of the decoloring section 15 in the conveying path 20, a second conveying roller 172 provided downstream in the sheet conveying direction of the decoloring section 15 in the conveying path 20, third conveying rollers 173 provided downstream in the sheet conveying direction of the second conveying roller 172 and in the first branch path 201, fourth conveying rollers 174 provided upstream in the sheet conveying direction of the first conveying roller 171 in the conveying path 20, and fifth conveying rollers 175 provided downstream in the sheet conveying direction of the second conveying roller 172 and in the second branch path 202. The conveying rollers 171 to 175 include pairs of conveying rollers opposed to each other.

A distance in the sheet conveying direction between the first and second conveying rollers 171 and 172 is a distance smaller than the length of the long side of the A4 size sheet. The distance may be a distance smaller than the length of the long side of the letter size sheet.

The first conveying roller 171 includes one-way clutches. The one-way clutches are provided between rotating shafts and outer rings of the first conveying roller 171. The one-way clutches transmit, from the rotating shafts to the outer rings, only rotation in one direction of the rotating shafts that feed a sheet to the downstream side in the sheet conveying direction. If the outer rings rotate faster than the rotating shafts in one direction side, the one-way clutches idly rotate the outer rings with respect to the rotating shafts. As the one-way clutches, a general-purpose product can be adopted. The one-way clutches may have any structure as long as the one-way clutches operate as explained above.

When a sheet nipped by the first conveying roller 171 is pulled to the downstream side in the sheet conveying direction by the second conveying roller 172, the first conveying roller 171 is idly rotated by the one-way clutches with respect to the rotating shafts to rotate following the sheet.

The sensor 18 detects that the leading end of the sheet reaches the second conveying roller 172 and the trailing end of the sheet passes through the second conveying roller 172. The sensor 18 may be an optical sensor that emits a laser and receives reflected light of the laser to detect whether the laser is blocked by the sheet. The sensor 18 may be a mechanical sensor that detects physical contact with the sheet to thereby detect whether the sheet reaches the second conveying roller 172.

The control section 19 includes a processor 191, an ASIC (Application Specific Integrated Circuit) 192, the memory 193, and a HDD (Hard Disk Drive) 194 and controls the entire decoloring apparatus 100.

The display section 21 includes a touch panel and also functions as an operation input section configured to receive an operation input.

A sheet decoloring processing method by the decoloring apparatus 100 is explained below with reference to a flowchart of FIG. 2 and FIGS. 3 to 6.

Figure 3:
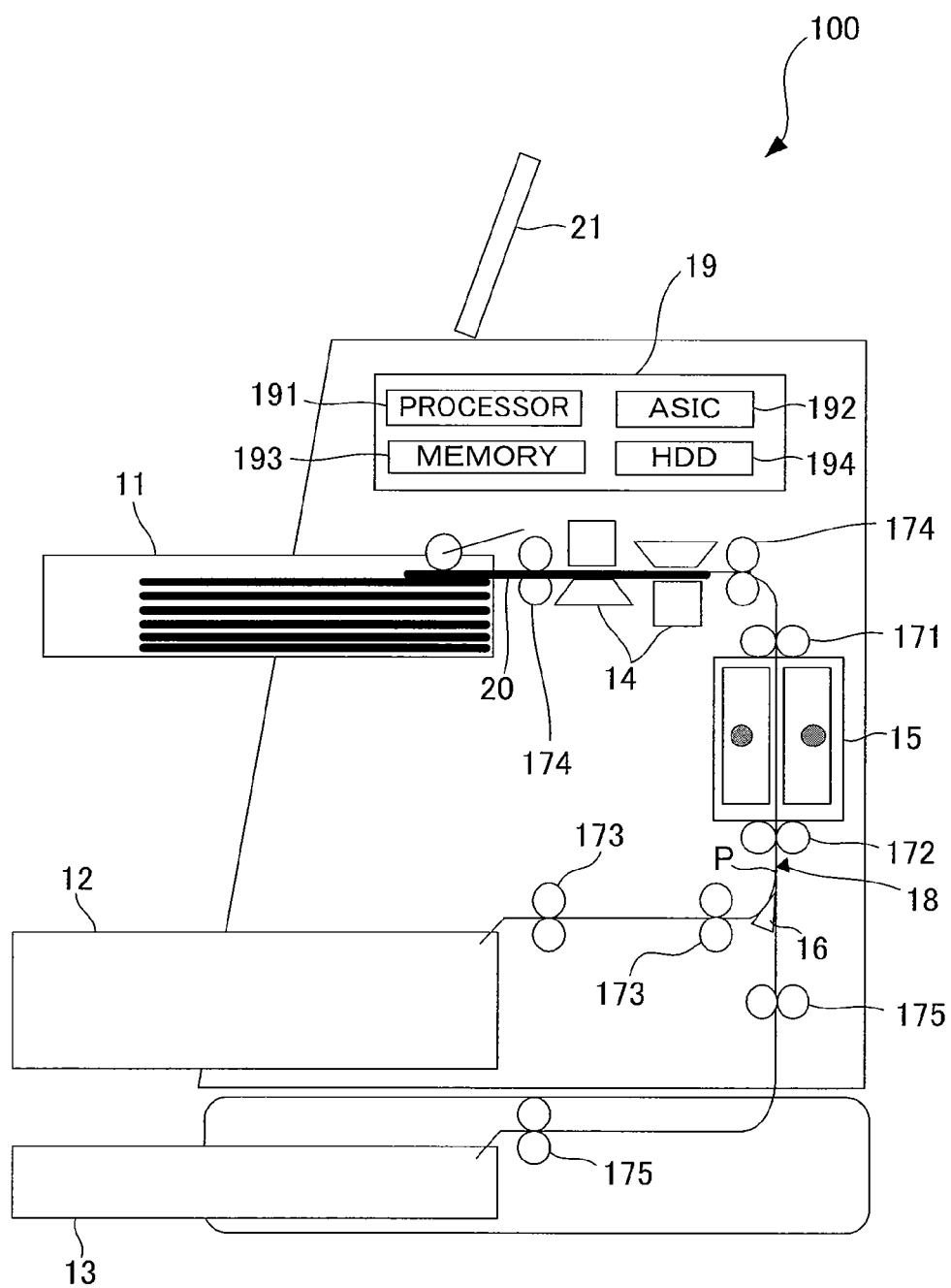
FIG. 3 is a diagram in which a sheet conveyed to reading sections is shown.

FIG. 3 is a diagram of a sheet conveyed to the reading section 14.

According to reception of an instruction for the decoloring processing on the touch panel, the control section 19 of the decoloring apparatus 100 feeds, for example, the A4 size sheet from the paper feeding tray 11 to the conveying path 20 (Act 1). It is assumed that an image is formed on the sheet with the decolorable color material.

The control section 19 conveys, with the fourth conveying roller 174, the sheet to the reading section 14 at 500 mm/s (first speed, fourth conveying speed) and reads, with the reading section 14, images for one sheet on the front and rear sides of the sheet (Acts 2 and 3).

Figure 4:
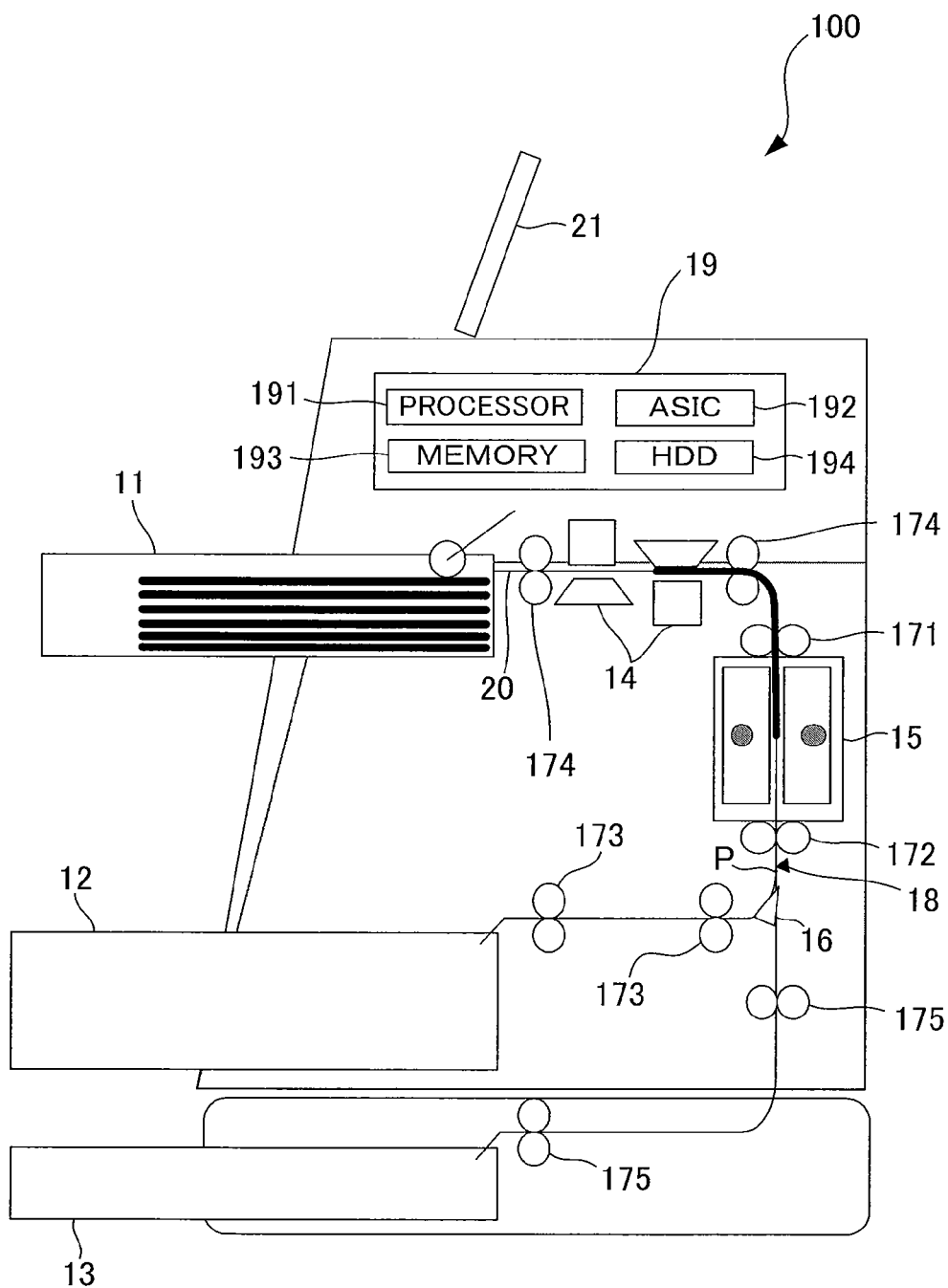
FIG. 4 is a diagram of a state of the sheet being read by the reading sections.

FIG. 4 is a diagram of a state of the sheet being read by the reading section 14.

When the reading section 14 ends the reading of the images for one sheet, the leading end of the sheet enters the decoloring section 15. In this state, the control section 19 of the decoloring apparatus 100 determines on the basis of image data whether the decoloring processing should be applied to the sheet (Act 4). Specifically, if decoloring prohibition information indicating that the images on the sheet should not be decolored, for example, a watermark indicating a company secret or the like or a predetermined code is included in the image, the control section 19 determines that the decoloring processing should not be applied to the sheet.

Figure 5:
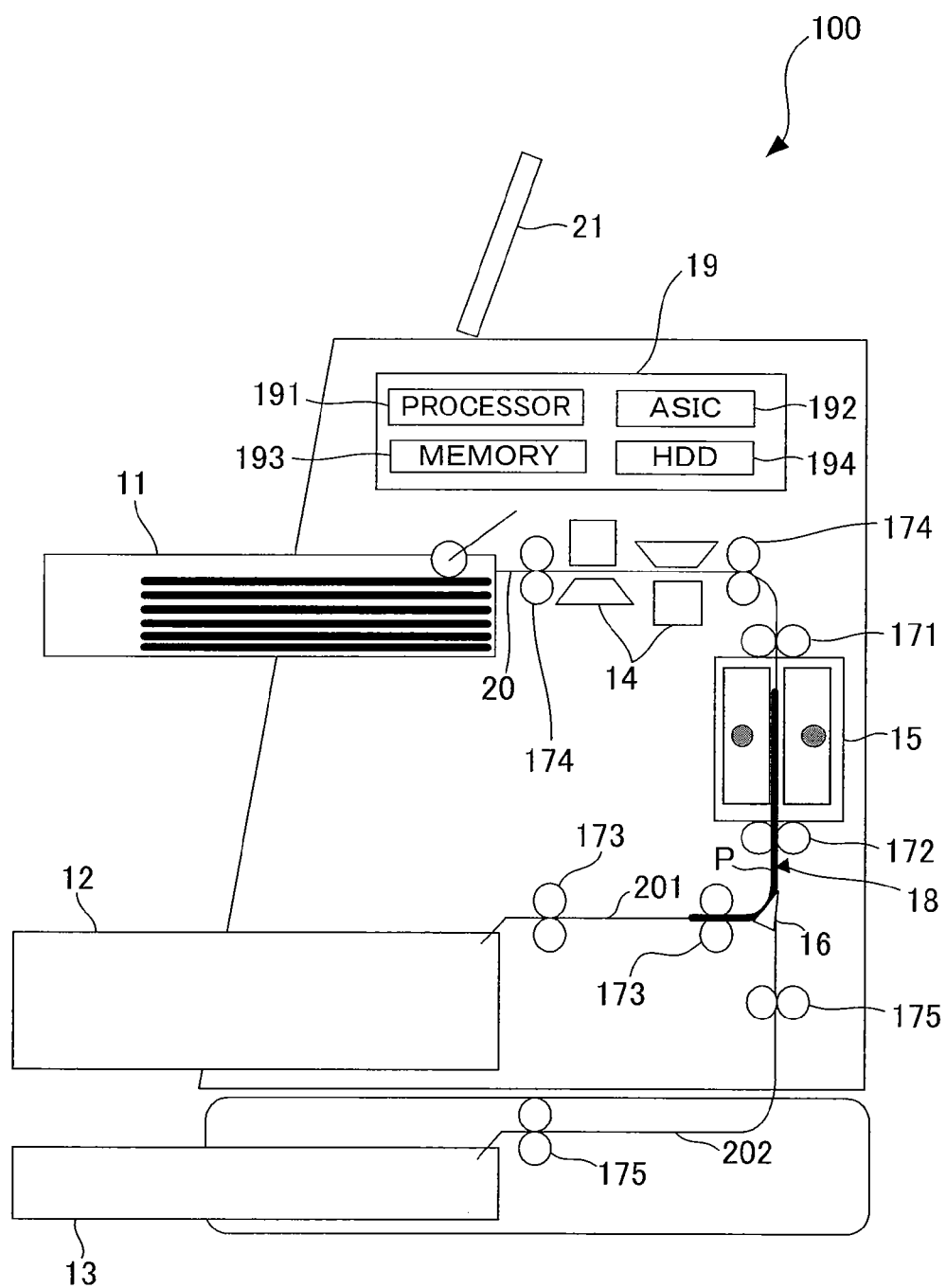
FIG. 5 is a diagram for explaining sheet conveyance control performed if the sheet is subjected to decoloring processing.

FIG. 5 is a diagram for explaining sheet conveyance control performed if the decoloring processing is applied to the sheet.

If the control section 19 determines that the decoloring processing should be applied to the sheet (YES in Act 4), the control section 19 reduces conveying speed of the sheet, causes the sheet to pass through the decoloring section 15 at speed (second speed) of about 250 mm/s, and applies the decoloring processing to the sheet with the decoloring section 15 (Act 5).

The control section 19 diverts, with the diverting section 16, the sheet subjected to the decoloring processing to the first branch path 201 (Act 6). If the control section 19 detects, with the sensor 18, that the sheet passes through the decoloring section 15 (YES in Act 7), the control section 19 increases the conveying speed to 500 mm/s again and conveys the sheet to the downstream side in the sheet conveying direction (Act 8). The control section 19 discharges the sheet to the reusable sheet tray 12 (Act 9).

Figure 6:
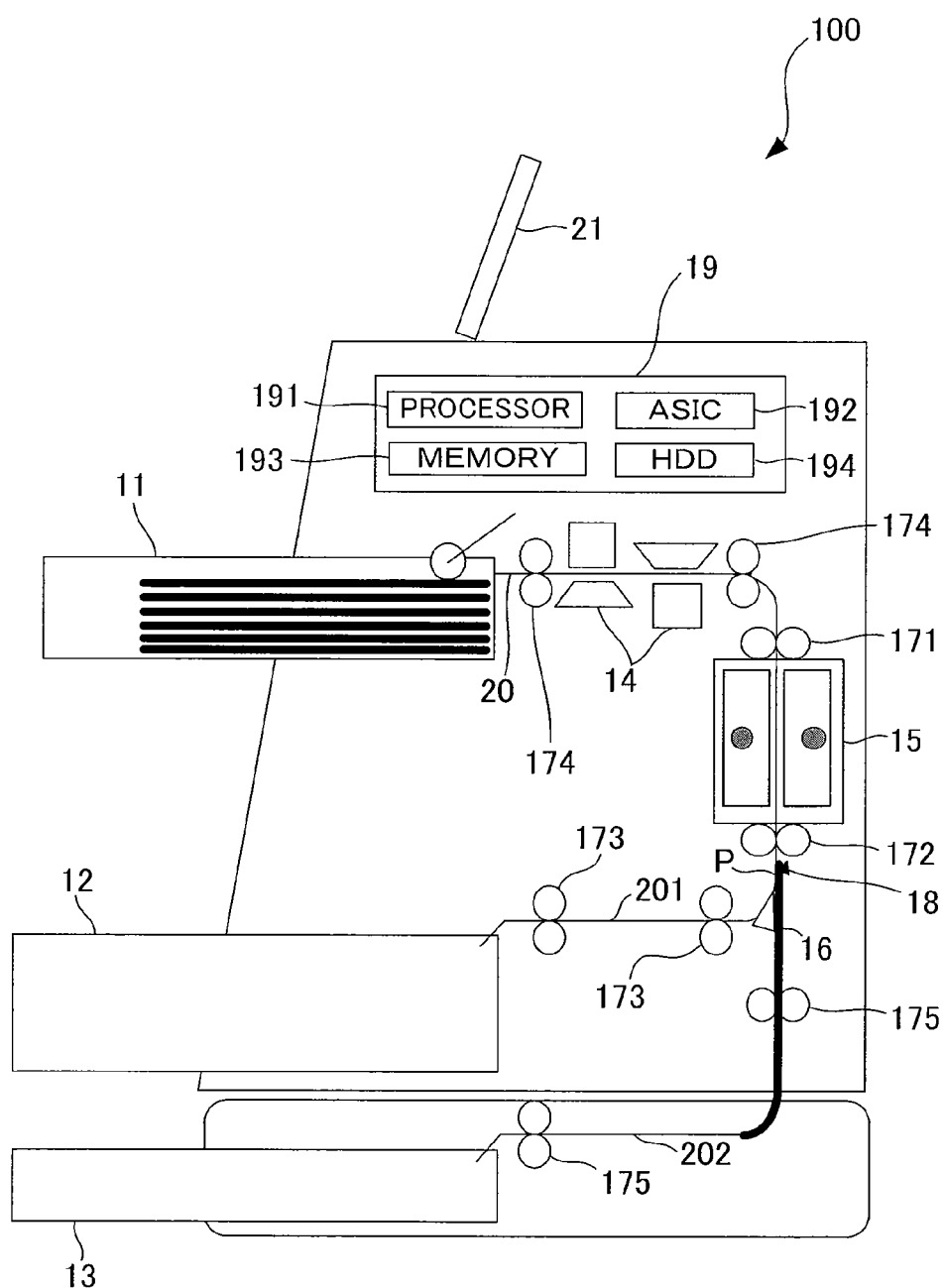
FIG. 6 is a diagram for explaining sheet conveyance control performed if the sheet is not subjected to the decoloring processing.

FIG. 6 is a diagram for explaining conveyance control for the sheet performed if the sheet is not subjected to the decoloring processing.

If the control section 19 determines that the decoloring processing should not be applied to the sheet (NO in Act 4), the control section 19 causes the sheet to pass through the decoloring section 15 while keeping the conveying speed of the sheet at 500 mm/s without reducing the conveying speed (Act 10).

After diverting the sheet to the second branch path 202 (Act 11), the control section 19 discharges the sheet to the unreusable sheet tray 13 (Act 12).

As explained in the background, after reading the images for one sheet with the reading section 14, if the decoloring apparatus 100 determines whether the prohibition information is included in the images and diverts the sheet to the branch path 201 or 202, it is necessary to secure length for one sheet between the reading section 14 and the branch point P.

In this embodiment, since the decoloring section 15 is provided in this dead space, compared with the related art in which a space exclusively for the decoloring section 15 is provided in the first branch path 201, it is possible to reduce the conveying path and reduce the size of the decoloring apparatus 100.

In this embodiment, if the decoloring processing is applied to the sheet, since the conveying speed of the sheet is reduced, it is possible to sufficiently apply the decoloring processing to the sheet.

Figure 7:
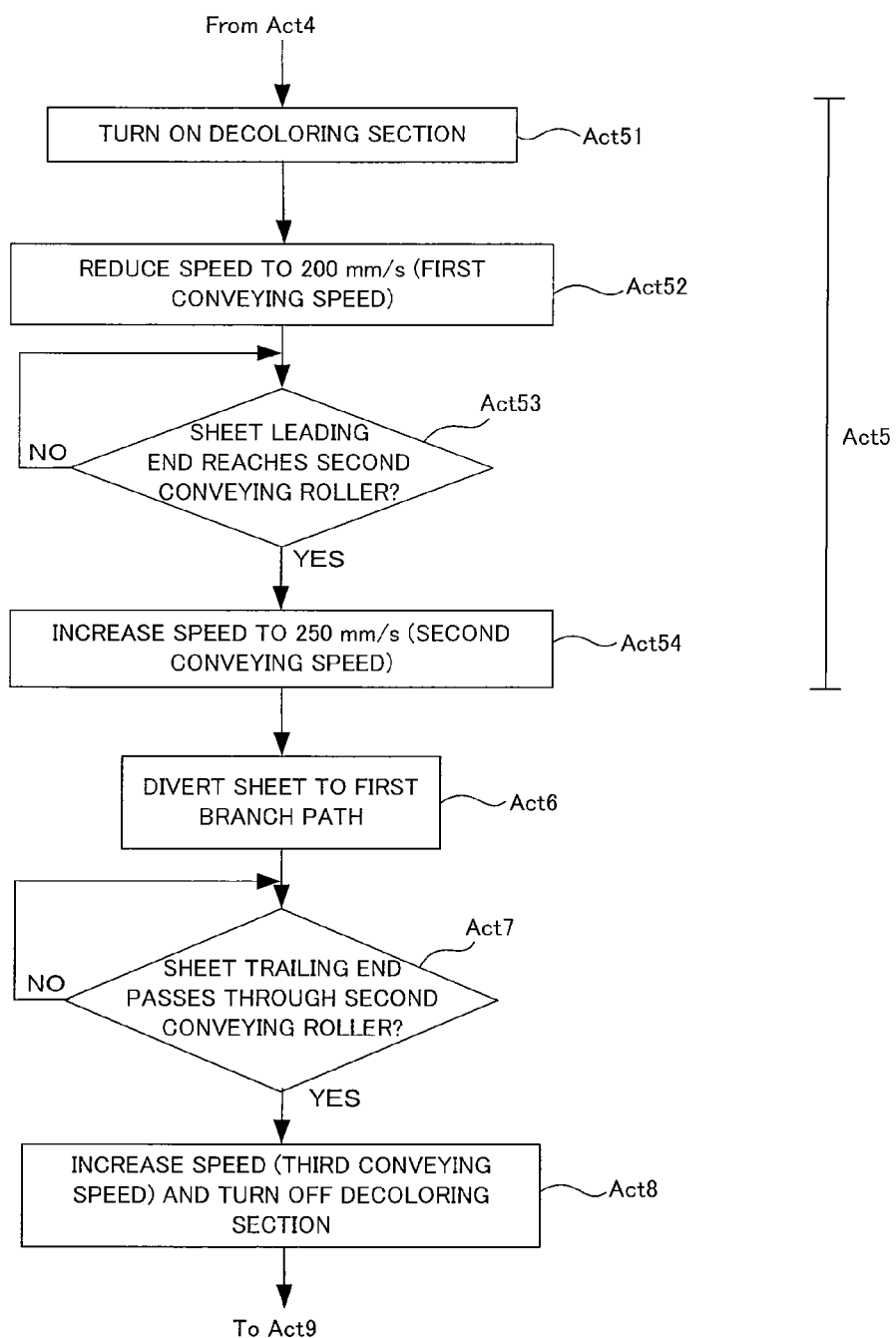
FIG. 7 is a flowchart for explaining a sheet decoloring processing method in decoloring sections.

A sheet conveying method in the decoloring section 15 is specifically explained below with reference to a flowchart of FIG. 7.

Figure 8:
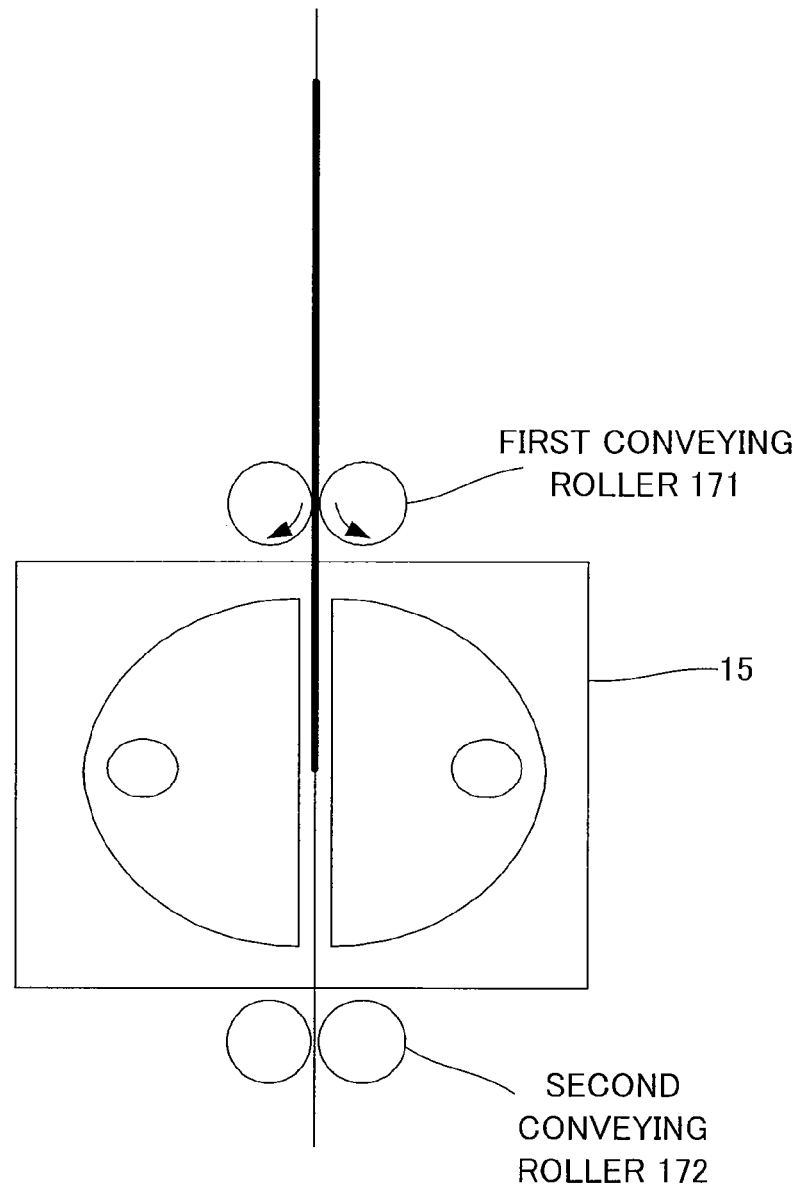
FIG. 8 is a diagram of a state of the sheet immediately after reading of images by the reading sections ends.

FIG. 8 is a diagram of a state of the sheet immediately after the reading of the images by the reading section 14 ends.

When the reading of the images by the reading section 14 ends, the leading end of the sheet is nipped and conveyed to the downstream side in the sheet conveying direction at 500 mm/s (fourth conveying speed) by the first conveying roller 171. In this state, if the control section 19 determines on the basis of image data that the decoloring processing should be applied to the sheet (YES in Act 4), the control section 19 turns on the decoloring section 15 and increases a heat radiation amount of the decoloring section 15 (Act 51).

Figure 9:
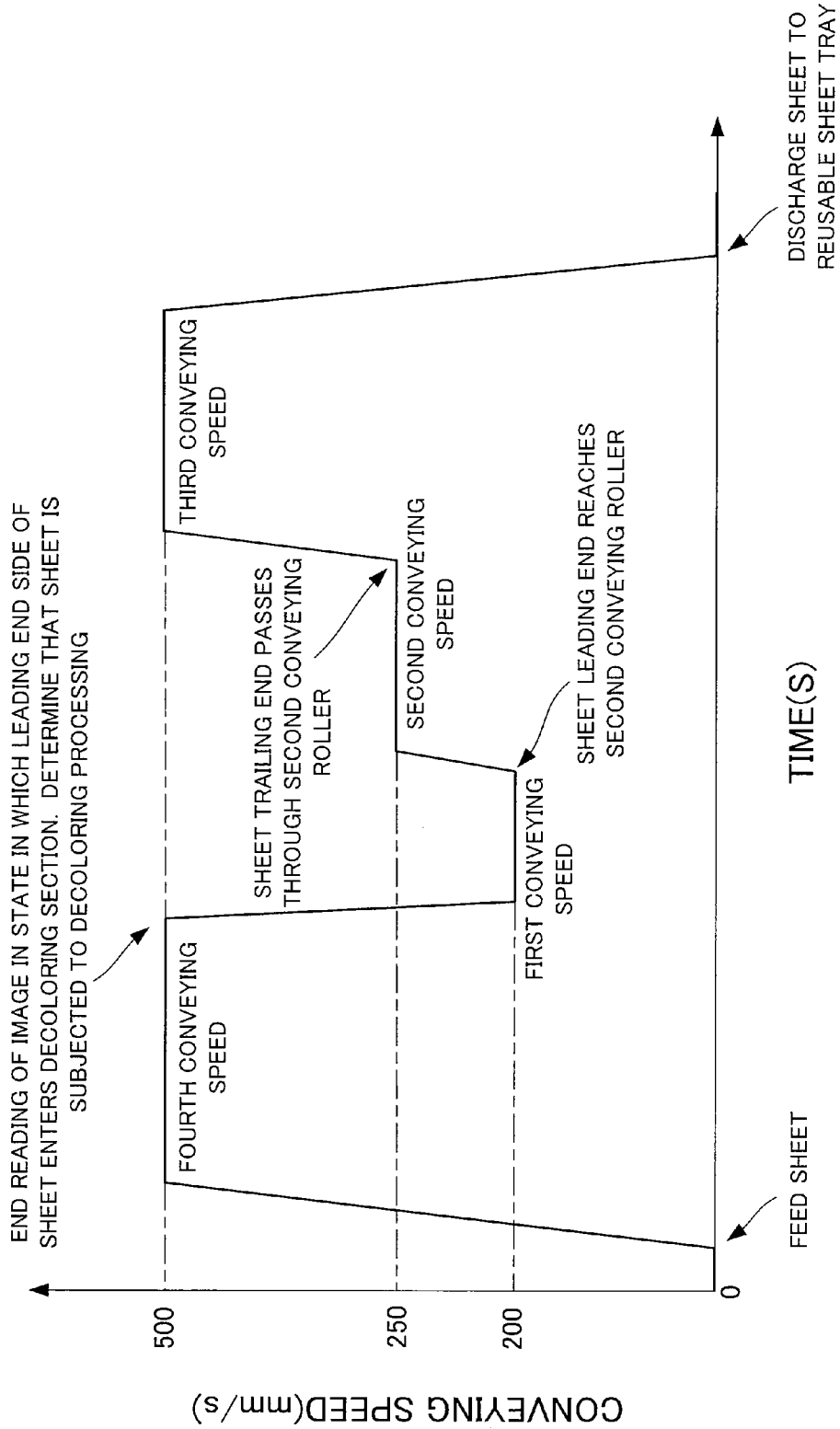
FIG. 9 is a graph of conveying speed of the sheet.

FIG. 9 is a graph of the conveying speed of the sheet.

At the same time, the control section 19 reduces the conveying speed of the sheet from 500 mm/s to 200 mm/s (first conveying speed). The control section 19 advances the sheet in the decoloring section 15 at slow speed 200 mm/s and heats the sheet with the decoloring section 15 (Act 52).

Figure 10:
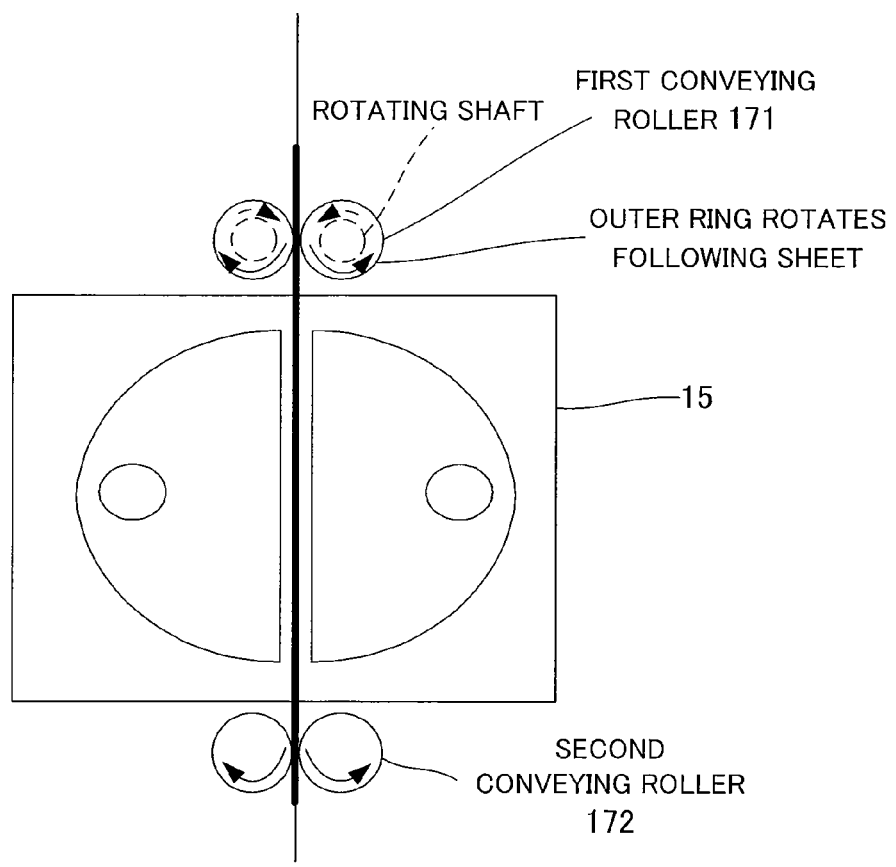
FIG. 10 is a diagram of a state in which the leading end of the sheet reaches a second conveying roller.

FIG. 10 is a diagram of a state in which the leading end of the sheet reaches the second conveying roller 172.

If the control section 19 detects, with the sensor 18, that the leading end of the sheet reaches the second conveying roller 172 (YES in Act 53), the control section 19 increases the conveying speed of the sheet to 250 mm/s (second conveying speed) and conveys the sheet with the first and second conveying rollers 171 and 172 (Act 54).

In conveying the sheet, the control section 19 rotates the second conveying roller 172 at rotating speed ($min^{-1}$) higher than the rotating speed of the first conveying roller 171 by 5%. When the second conveying roller 172 is rotated, in the first conveying roller 171 including the one-way clutches, since the sheet is pulled to the downstream side in the sheet conveying direction, the outer rings idly rotate with respect to the rotating shafts to rotate following the sheet. In this way, even if a bend occurs in the sheet because of heating of the sheet, the leading end side is pulled to the downstream side in the sheet conveying direction by the second conveying roller 172. The trailing end side is sent to the downstream side in the sheet conveying direction by the first conveying roller 171. Therefore, the sheet is pulled to the downstream side in the sheet conveying direction and the bend is eliminated.

The first and second conveying rollers 171 and 172 may be driven by separate motors controlled by the control section 19. Alternatively, torque may be transmitted to the first and second conveying rollers 171 and 172 from the same driving source at different gear ratios.

The control section 19 diverts the sheet to the branch path 201 with the diverting section 16 while applying the decoloring processing to the sheet with the decoloring section 15 (Act 6). If the control section 19 detects, with the sensor 18, that the trailing end of the sheet passes through the decoloring section 15, i.e., the second conveying roller 172 (YES in Act 7), the control section 19 increases the conveying speed of the sheet to 500 mm/s (third conveying speed) again and conveys the sheet to the reusable sheet tray 12 with the third conveying roller 173 and turns off the decoloring section 15 (Act 8).

In the past, there is known a decoloring apparatus that heats, with a decoloring section, a sheet on which an image is formed with a decolorable color material, which is decolored if heated, and decolors the image. As such a decoloring apparatus, there is a decoloring apparatus that heats the sheet with a decoloring section not in contact with the sheet considering that foreign matters or the like enter between the decoloring section and the sheet.

In such a decoloring apparatus, since the sheet is heated in a noncontact manner, the leading end of the sheet tends to be deformed by heat and a jam tends to occur. Further, in such a decoloring apparatus, it is conceivable to perform the decoloring processing at low speed in order to suppress occurrence of a jam. However, in this case, a decoloring processing ability is deteriorated.

In this embodiment, since the first conveying roller 171 conveys the sheet at the low first conveying speed (200 mm/s) into the decoloring section 15, occurrence of a jam can be suppressed. In this embodiment, at timing when the leading end of the sheet passes through the decoloring section 15 and deformation is suppressed, the conveying speed of the sheet is increased to the second conveying speed (250 mm/s) to convey the sheet. Therefore, it is possible to satisfactorily maintain the decoloring processing ability while suppressing occurrence of a jam.

Second Embodiment

In a second embodiment, the configuration of the decoloring apparatus 100 is the same as the configuration of the decoloring apparatus 100 according to the first embodiment. Only sheet conveying speed control in applying the decoloring processing to the sheet with the decoloring section 15 is different.

Figure 11:
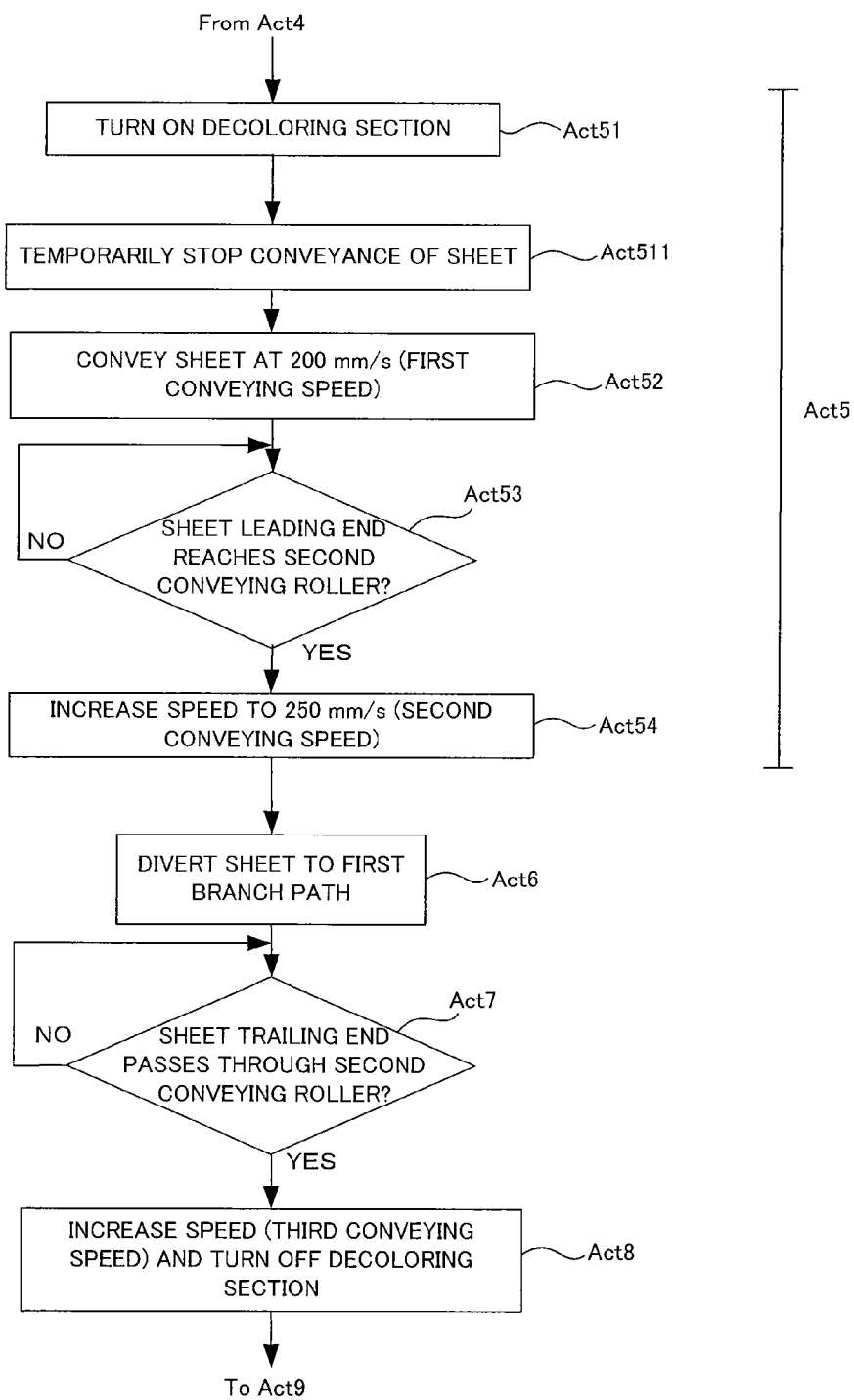
FIG. 11 is a flowchart of sheet conveying speed control in the decoloring sections.
Figure 12:
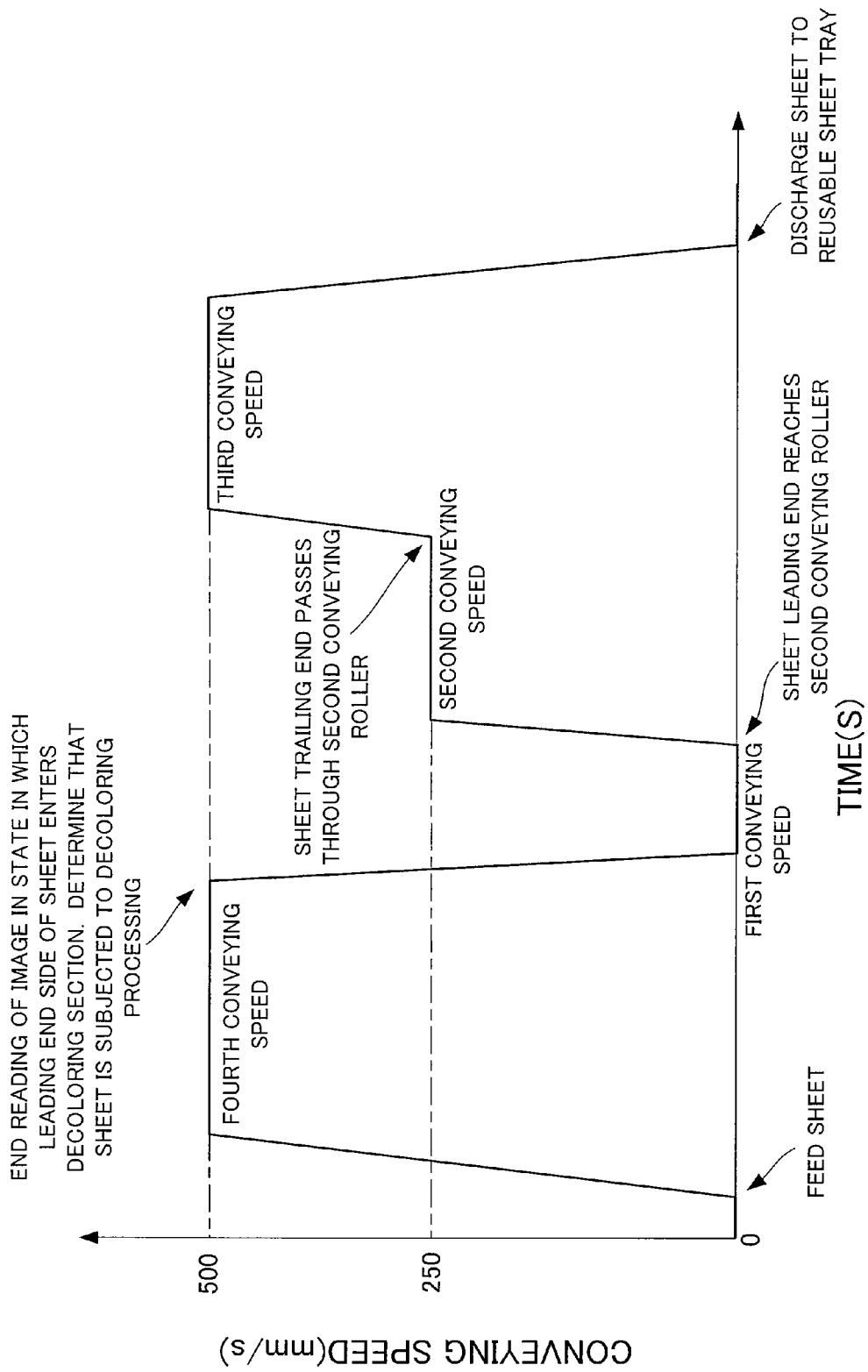
FIG. 12 is a graph of conveying speed of a sheet.

FIG. 11 is a flowchart for explaining the sheet conveying speed control in the decoloring section 15. FIG. 12 is a graph of conveying speed of the sheet.

In a state in which reading of the images on the sheet by the reading section 14 ends and the leading end side of the sheet enters the decoloring section 15, if the control section 19 determines that the decoloring processing should be applied to the sheet (YES in Act 4), the control section 19 in this embodiment turns on the decoloring section 15 (Act 51) and temporarily stops the conveyance of the sheet (Act 511).

Thereafter, the control section 19 conveys the sheet at low speed 250 mm/s (the second conveying speed) in the decoloring section 15 (Act 52) and diverts the sheet to the first branch path 201 with the diverting section 16 (Act 6). If the control section 19 detects, with the sensor 18, that the trailing end of the sheet passes through the second conveying roller 172 (YES in Act 7), the control section 19 increases the conveying speed of the sheet to 500 mm/s (the third conveying speed) again and conveys the sheet to the reusable sheet tray 12 (Act 8).

Third Embodiment

Figure 13:
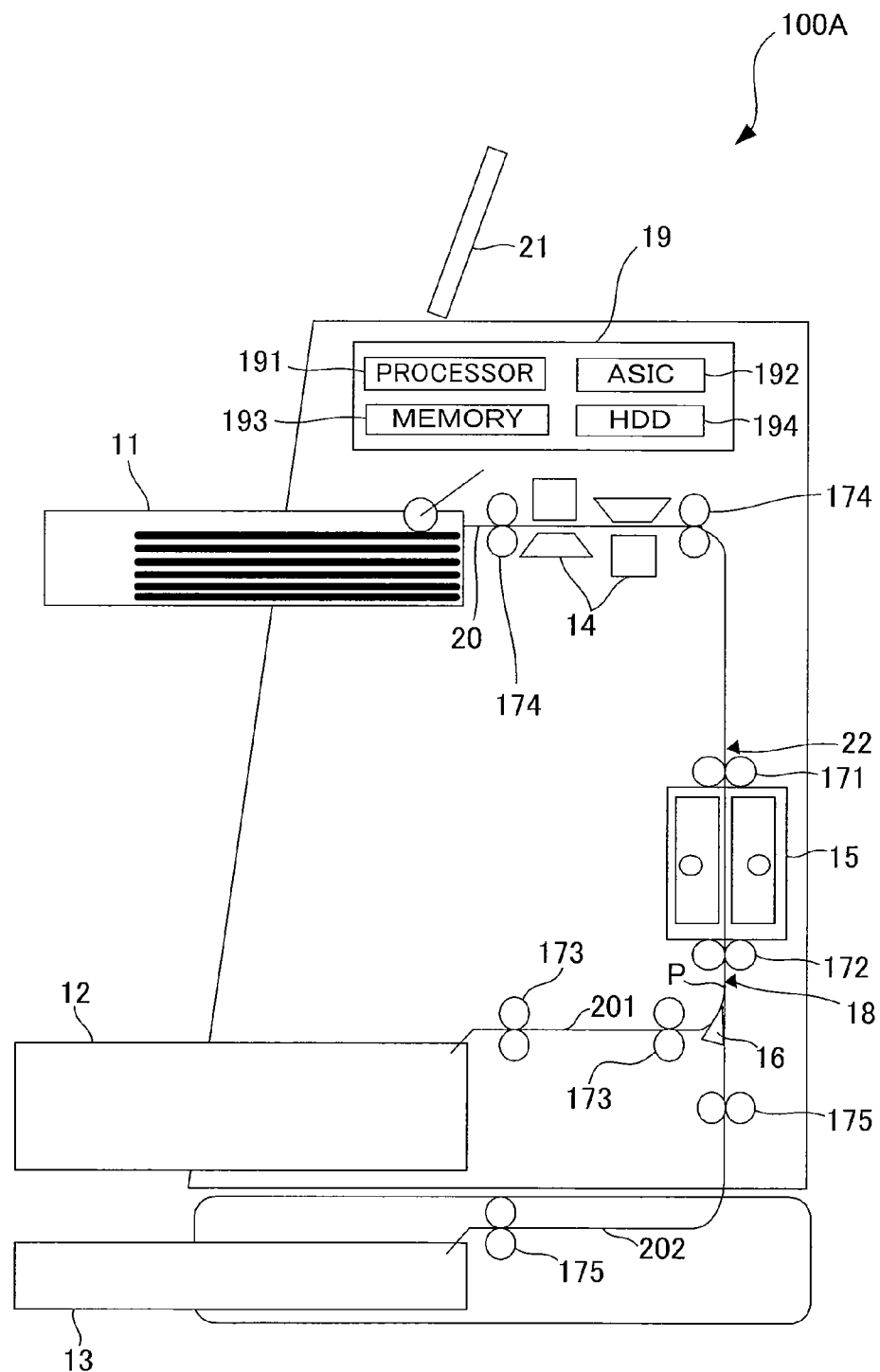
FIG. 13 is a diagram of the configuration of a decoloring apparatus.

FIG. 13 is a diagram of the configuration of a decoloring apparatus 100A.

In a third embodiment, in the conveying path 20, a distance in a sheet conveying direction between the reading section 14 and the decoloring section 15 is a distance slightly larger than the length of the long side of the A4 size sheet. The distance may be a distance slightly larger than the length of the long side of the letter size sheet. In the conveying path 20, a sensor 22 that detects that the leading end of a sheet reaches the first conveying roller 171 is provided. The other components of the decoloring apparatus 100A are the same as the components in the first embodiment. In this embodiment, only sheet conveying speed control in applying decoloring processing to the sheet with the decoloring section 15 is partially different from the sheet conveying speed control in the first embodiment.

Figure 14:
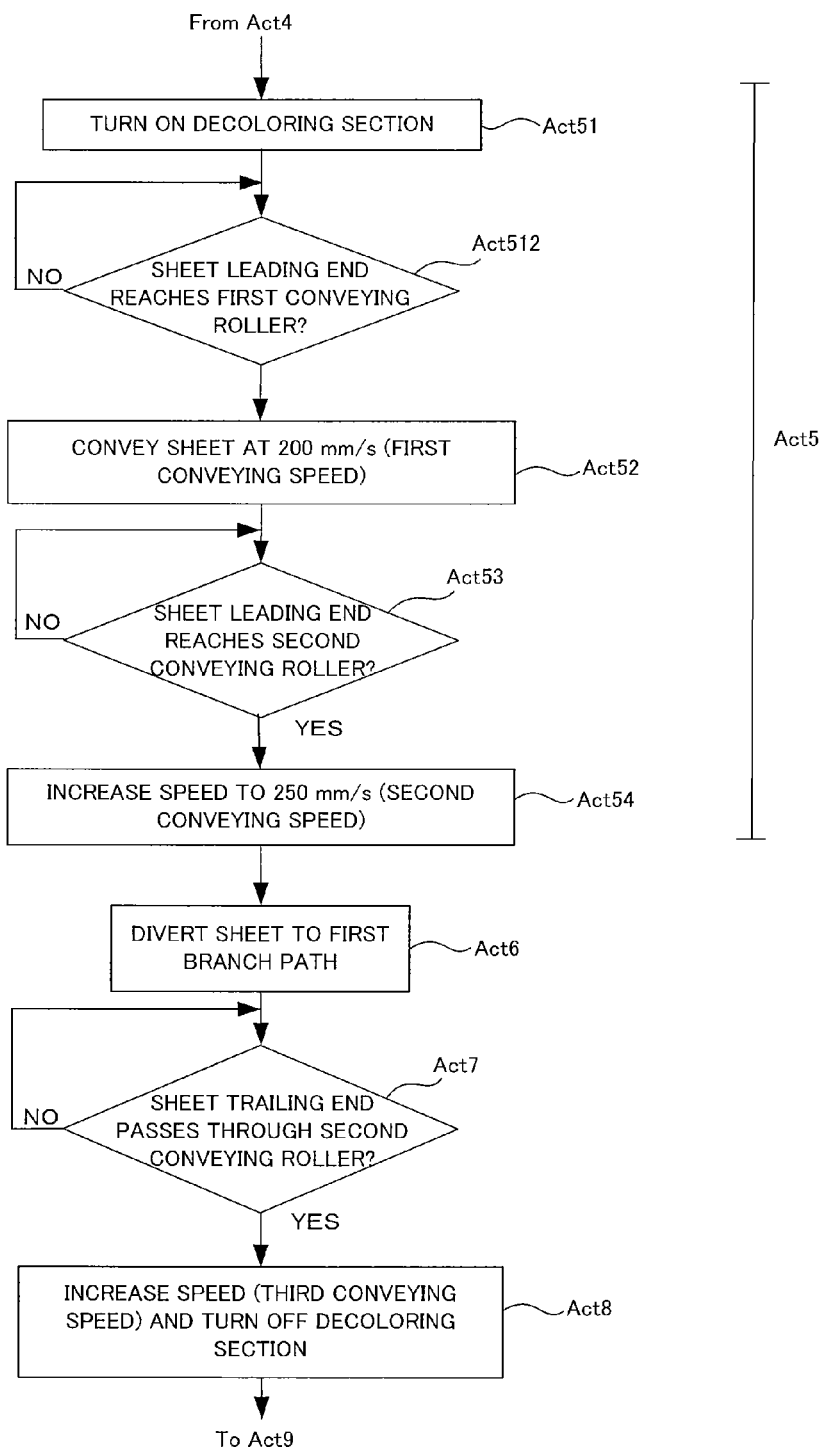
FIG. 14 is a flowchart for explaining sheet conveying speed control in decoloring sections.

FIG. 14 is a flowchart for explaining the sheet conveying speed control in the decoloring section 15.

In this embodiment, if the reading section 14 reads the images on the sheet and the control section 19 determines that the sheet should be decolored, the control section 19 turns on the decoloring section 15 and conveys the sheet to the first conveying roller 171 at 500 mm/s (Act 51).

If the sensor 22 detects that the leading end of the sheet reaches the first conveying roller 171 (Act 512), the control section 19 reduces conveying speed of the sheet to 200 mm/s (Act 52). The following Acts 53, 54, and 6 to 9 are the same as the acts in the first embodiment.

In this embodiment, even if the sheet is conveyed to the first conveying roller 171 provided just upstream in the sheet conveying direction of the decoloring section 15 at normal conveying speed 500 mm/s (the fourth conveying speed), if the sheet reaches the first conveying roller 171, occurrence of a jam is prevented by automatically reducing the conveying speed and conveying the sheet into the decoloring section 15 at 200 mm/s (the first conveying speed). In this embodiment, if the leading end of the sheet reaches the second conveying roller 171, the sheet is conveyed with the conveying speed increased to speed 250 mm/s (the second conveying speed) at a limit where the sheet can be decolored. In this embodiment, if the sheet passes through the decoloring section 15, the sheet is conveyed at normal conveying speed 500 mm/s (the third conveying speed). In this way, in this embodiment, the sheet conveyed to the decoloring section 15 is conveyed at the conveying speeds divided into three stages. Therefore, it is possible to simultaneously attain prevention of occurrence of a jam and maintenance of a decoloring processing ability.

According to the embodiments, techniques explained below can be provided.

1. A decoloring apparatus comprising:

a decoloring section provided in a conveying path and configured to apply, in a noncontact manner, decoloring processing to a sheet on which an image is formed with a decolorable color material;

a first conveying roller provided upstream in a sheet conveying direction of the decoloring section in the conveying path and configured to nip and convey the sheet;

a second conveying roller provided downstream in the sheet conveying direction of the decoloring section in the conveying path and configured to nip and convey the sheet; and a control section configured to control the first and second conveying rollers, convey, with the first conveying roller, the sheet into the decoloring section at first conveying speed, and convey, if determining that a leading end of the sheet reaches the second conveying roller, with the second conveying roller, the sheet to the downstream side in the sheet conveying direction at second conveying speed higher than the first conveying speed.

2. The apparatus according to item 1, wherein a distance in the sheet conveying direction between the first and second conveying rollers is smaller than length of an A4 size sheet or length of a letter size sheet.

3. The apparatus according to item 1, wherein the first conveying roller includes a one-way clutch and is, when the sheet nipped by the first conveying roller is pulled to the downstream side in the sheet conveying direction by the second conveying roller, idly rotated by the one-way clutch with respect to a rotating shaft and rotates following the sheet.

4. The apparatus according to item 1, wherein
in the conveying path, a third conveying roller is provided downstream in the sheet conveying direction of the second conveying roller, and
the control section conveys, if determining that a trailing end of the sheet passes through the second conveying roller, with the third conveying roller, the sheet to the downstream side in the sheet conveying direction at third conveying speed higher than the second conveying speed.

5. The apparatus according to item 1, wherein in the conveying path, a fourth conveying roller is provided upstream in the sheet conveying direction of the first conveying roller, and
the control section conveys, with the fourth conveying roller, the sheet to the decoloring section at fourth conveying speed higher than the first and second conveying speeds and conveys, if determining that the leading end of the sheet reaches the first conveying roller, with the first conveying roller, the sheet into the decoloring section at the first conveying speed lower than the fourth conveying speed.

6. A sheet conveying method by a decoloring apparatus including: a decoloring section provided in a conveying path and configured to apply, in a noncontact manner, decoloring processing to a sheet on which an image is formed with a decolorable color material; a first conveying roller provided upstream in a sheet conveying direction of the decoloring section in the conveying path and configured to nip and convey the sheet; and a second conveying roller provided downstream in the sheet conveying direction of the decoloring section in the conveying path and configured to nip and convey the sheet,
the method comprising:
controlling the first and second conveying rollers and conveying the sheet into the decoloring section at first conveying speed with the first conveying roller; and
conveying, if it is determined that a leading end of the sheet reaches the second conveying roller, with the second conveying roller, the sheet to the downstream side in the sheet conveying direction at second conveying speed higher than the first conveying speed.

7. The method according to item 6, wherein a distance in the sheet conveying direction between the first and second conveying rollers is smaller than length of an A4 size sheet or length of a letter size sheet.

8. The method according to item 6, wherein the first conveying roller includes a one-way clutch and is, when the sheet nipped by the first conveying roller is pulled to the downstream side in the sheet conveying direction by the second conveying roller, idly rotated by the one-way clutch with respect to a rotating shaft of the first conveying roller and rotates following the sheet.

9. The method according to item 6, wherein
in the conveying path, a third conveying roller is provided downstream in the sheet conveying direction of the second conveying roller, and
the method further comprises conveying, if it is determined that a trailing end of the sheet passes through the second conveying roller, with the third conveying roller, the sheet to the downstream side in the sheet conveying direction at third conveying speed higher than the second conveying speed.

10. The method according to item 6, wherein
in the conveying path, a fourth conveying roller is provided upstream in the sheet conveying direction of the first conveying roller, and
the method further comprises conveying, with the fourth conveying roller, the sheet to the decoloring section at fourth conveying speed higher than the first and second conveying speeds and conveying, if it is determined that the leading end of the sheet reaches the first conveying roller, with the first conveying roller, the sheet into the decoloring section at the first conveying speed lower than the fourth conveying speed.

In the embodiments, the third conveying speed and the fourth conveying speed are equal. However, the third conveying speed and the fourth conveying speed may be different.

In the embodiments, the control section 19 determines, according to output information from the sensor 18, the reaching of the leading end of the sheet to the second conveying roller 172 and the passage through the second conveying roller 172 of the trailing end of the sheet. However, the control section 19 may determine, on the basis of target information concerning the conveying speed of the sheet by the conveying rollers 17, accumulated time from the feeding of the sheet from the paper feeding tray 11, or the like, the reaching of the leading end of the sheet to the second conveying roller 172 and the passage through the second conveying roller 172 of the trailing end of the sheet.

A form of a storage medium may be any form as long as the recording medium can store a computer program and can be read by a computer. Specifically, examples of the recording medium include an internal storage device internally mounted in a computer such as a ROM or a RAM, a portable storage medium such as a CD-ROM, a flexible disk, a DVD disk, a magneto-optical disk, or an IC card, a database that stores a computer program, and other computers and databases of the computers. Functions obtained by installation or download may be realized in cooperation with an OS or the like in an apparatus. The computer program may be an execution module dynamically generated partially or entirely.

The order of the kinds of processing in the embodiments may be different from the order explained as an example in the embodiments.

As explained above in detail, according to the technique described in this specification, it is possible to provide a technique for arranging components in a decoloring apparatus.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A decoloring apparatus comprising:
a reading section configured to read an image on a sheet on which the image is formed with a decolorable color material;
a decoloring section positioned on a sheet conveying path downstream of the reading section in a sheet conveying direction and configured to heat the sheet to decolor the image formed with the decolorable color material;
a first branch path positioned on the sheet conveying path downstream of the decoloring section in the sheet conveying direction;

a second branch path positioned on the sheet conveying path downstream of the decoloring section in the sheet conveying direction;

a diverting section positioned on the sheet conveying path at a branch point of the first branch path and the second branch path; and a control section configured to determine on the basis of the image read by the reading section whether a decoloring processing should be applied to the sheet, to control the diverting section to convey the sheet to the first branch path after applying the decoloring processing to the sheet with the decoloring section if it is determined that the decoloring processing should be applied to the sheet, and to control the diverting section to convey the sheet to the second branch path after causing the sheet to pass through the decoloring section without applying the decoloring processing to the sheet if it is determined that the decoloring processing should not be applied to the sheet.

2. The apparatus according to claim 1, further comprising a conveying roller configured to convey the sheet in the conveying path, wherein the control section is configured to control the conveying roller to cause the sheet to pass a first speed through the decoloring section if it is determined that the decoloring processing should not be applied to the sheet, and to cause the sheet to pass at a second speed lower than the first speed through the decoloring section if it is determined that the decoloring processing should be applied to the sheet.

3. The apparatus according to claim 2, wherein the control section is configured to control the conveying roller to cause the sheet to pass through the reading section at the first speed.

4. The apparatus according to claim 2, wherein the control section is configured to determine whether a leading end of the sheet reaches the decoloring section when the reading section is reading the image on the sheet, and to control the conveying roller to temporarily stop conveyance of the sheet in a state at which the leading end of the sheet has entered the decoloring section if it is determined that the leading end of the sheet has reached the decoloring section when the reading section is reading the image on the sheet and that the decoloring processing should be applied to the sheet.

5. The apparatus according to claim 2, wherein the control section is configured to control the conveying roller to convey the sheet to the reading section at the first speed, to determine whether a leading end of the sheet has reached the decoloring section when the reading section is reading the image on the sheet, and to switch the conveying speed of the sheet from the first speed to the second speed in a state in which a part of the sheet has entered the decolorinq section, if it is determined that the leading end of the sheet has reached the decoloring section when the reading section is reading the image on the sheet and that the decoloring processing should be applied to the sheet.

6. The apparatus according to claim 1, wherein the decoloring section is positioned on the sheet conveying path in a position where a leading end of an A4 size or letter size sheet reaches the decoloring section before reading of the same sheet ends in the reading section.

7. A control method for a decoloring apparatus including: a reading section positioned on a sheet conveying path and configured to read an image on a sheet on which the image is formed with a decolorable color material; a conveying roller configured to convey the sheet in the conveying path; a decolorinq section positioned on a sheet conveying path downstream of the reading section in a sheet conveying direction and configured to heat the sheet to decolor the image formed with the decolorable color material; a first branch path positioned on the sheet conveying path downstream of the decoloring section in the sheet conveying direction; a second branch path positioned on the sheet conveying path downstream of the decolorinq section in the sheet conveying direction; and a diverting section positioned on the sheet conveying path at a branch point of the first branch path and the second branch path, the method comprising:

determining, on the basis of the image read by the reading section, whether a decoloring processing should be applied to the sheet;

controlling the diverting section to convey the sheet to the first branch path or to the second branch path, wherein the diverting section is controlled to convey the sheet to the first branch path after applying a decolorinq processing to the sheet with the decoloring section if it is determined that the decoloring processing should be applied to the sheet, and the diverting section is controlled to convey the sheet to the second branch after causing the sheet to pass through the decoloring section without applying the decolorinq processing to the sheet if it is determined that the decoloring processing should not be applied to the sheet; and controlling the conveying roller to convey the sheet through the decoloring section at a first speed if it determined that the decoloring processing should not be applied to the sheet and at a second speed lower than the first speed if it is determined that the decoloring processing should be applied to the sheet.

8. The method according to claim 7, further comprising controlling the conveying roller to convey the sheet to the reading section at the first speed.

9. The method according to claim 7, further comprising:

determining whether a leading end of the sheet reaches the decoloring section when the reading section is reading the image on the sheet; and controlling the conveying roller to temporarily stop conveyance of the sheet in a state at which the leading end of the sheet has entered the decolorinq section if it is determined that the leading end of the sheet has reached the decoloring section when the reading section is reading the image on the sheet and that the decoloring processing should be applied to the sheet.

10. The method according to claim 7, further comprising:

conveying the sheet to the reading section at the first speed; and switching the conveying speed of the sheet from the first speed to the second speed in a state in which a part of the sheet has entered the decolorinq section if it is determined that a leading end of the sheet has reached the decoloring section when the reading section is reading the image on the sheet and that the decoloring processing should be applied to the sheet.

11. The method according to claim 7, wherein the decoloring section is positioned on the conveying path in a position where a leading end of an A4 size or letter size sheet reaches the decoloring section before reading of the same sheet ends in the reading section.

12. A decoloring apparatus comprising:

reading means for reading an image on a sheet on which the image is formed with a decolorable color material;

decoloring means positioned on a sheet conveying path downstream of the reading means in a sheet conveying direction and configured to heat the sheet to decolor the image formed with the decolorable color material a first branch path positioned on the sheet conveying path downstream of the decoloring means in the sheet conveying direction;

a second branch path positioned on the sheet conveying path downstream of the decoloring means in the sheet conveying direction;

diverting means positioned on the sheet conveying path at a branch point of the first branch path and the second branch path; and control means for determining on the basis of the image read by the reading means whether decoloring processing should be applied to the sheet, controlling the diverting means to convey the sheet to the first branch path after applying the decoloring processing to the sheet with the decoloring means if it is determined that the decoloring processing should be applied to the sheet, and controlling the diverting means to convey the sheet to the second branch path after causing the sheet to pass through the decoloring means without applying the decoloring processing to the sheet if it is determined that the decoloring processing should not be applied to the sheet.

13. The apparatus according to claim 12, further comprising a conveying roller configured to convey the sheet in the conveying path, wherein the control means controls the conveying roller to cause the sheet to pass at a first speed through the decoloring means if it is determined that the decoloring processing should not be applied to the sheet, and to cause the sheet to pass at a second speed lower than the first speed through the decoloring means if it is determined that the decoloring processing should be applied to the sheet.

14. The apparatus according to claim 13, wherein the control means is configured to control the conveying roller to cause the sheet to pass through the reading means at the first speed.

15. The apparatus according to claim 13, wherein the control means is configured to determine whether a leading end of the sheet reaches the decoloring means when the reading means is reading the image on the sheet, and to control the conveying roller to temporarily stop conveyance of the sheet in a state at which the leading end of the sheet has entered the decoloring means if it is determined that the leading end of the sheet has reached the decoloring means when the reading means is reading the image on the sheet and that the decoloring processing should be applied to the sheet, the conveyance of the sheet.

16. The apparatus according to claim 13, wherein the control means is configured to control the conveying roller to convey the sheet to the reading means at the first speed, to determine whether a leading end of the sheet has reached the decoloring means when the reading means is reading the image on the sheet, and to switch the conveying speed of the sheet from the first speed to the second speed in a state in which a part of the sheet has entered the decoloring means if it is determined that the leading end of the sheet has reached the decoloring means when the reading means is reading the image on the sheet and that the decoloring processing should be applied to the sheet.

17. The apparatus according to claim 12, wherein the decoloring means is positioned on the conveying path in a position where a leading end of an A4 size or letter size sheet reaches the decoloring means before reading of the same sheet ends in the reading means.

* * * * *